May 6, 1952     L. H. BEDFORD ET AL     2,595,754
NULL VOLTAGE INDICATING CIRCUIT
Original Filed Nov. 30, 1943
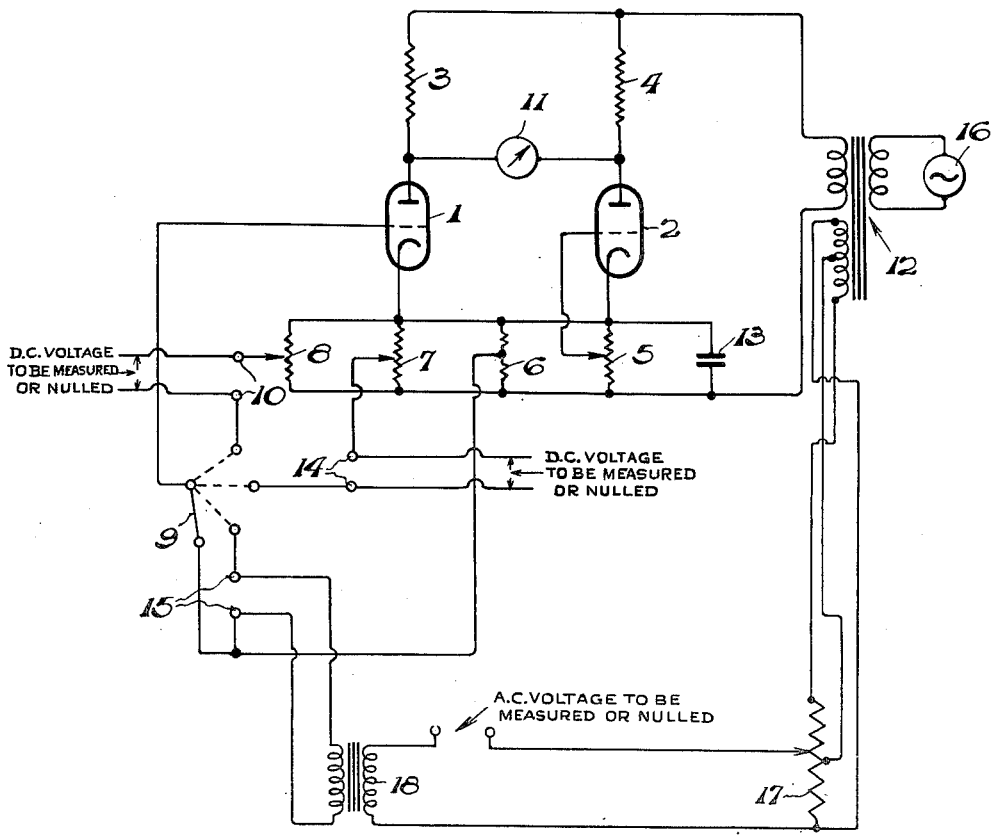
INVENTORS
Leslie Herbert Bedford
John Bell
BY Eric Miles Langham
Loyd Hall Sutton
attorney Patented May 6, 1952

2,595,754

UNITED STATES PATENT OFFICE 2,595,754

NULL VOLTAGE INDICATING CIRCUIT

Leslie Herbert Bedford, London, and John Bell and Eric Miles Langham, Teddington, England, assignors to A. C. Cossor Limited, London, England, a British company Original application November 30, 1943, Serial No. 512,402. Divided and this application July 26, 1946, Serial No. 686,478. In Great Britain November 30, 1942

4 Claims. (Cl. 171—95)

This invention relates to thermionic valve circuits for voltage measurement or indication.

According to the invention there is provided a null voltage indicating circuit, comprising a pair of similar thermionic valves having similar anode loads, a direct current null indicating meter connected between the anodes of said valves, a common cathode load for said valves consisting of two resistance potentiometers, connected in parallel with each other and with a smoothing condenser, means to excite the anode circuit with alternating voltage, means to connect the grid of one of said valves to a tapping on one of said potentiometers and means to inject the voltage to be nulled between the grid of the other of said valves and a tapping on the other of said potentiometers so selected that when said voltage is zero a null indication is obtained on said meter.

The circuit according to the invention is capable of use for nulling either a direct voltage, or an alternating voltage of the same frequency as the alternating voltage which excites the anode circuit; but in the latter case the voltage to be nulled must not be in quadrature with that which excites the anode circuit.

In a preferred form of the invention, the circuit is arranged for measuring a direct voltage injected in place of said voltage to be nulled, the tapping to which said voltage is connected being made moveable so as to add, in series with said injected direct voltage, an opposing direct voltage being a fraction of the total voltage developed across said potentiometers, and the degree of said movement necessary to produce a null indication being taken as the measure of the direct voltage injected.

In another preferred form of the invention, the circuit is arranged for alternatively measuring a direct voltage which is relatively invariable, and measuring or nulling at least one other voltage, said circuit having another resistance potentiometer connected in parallel into said cathode load, and having switching means whereby the grid of one of said valves may be connected alternately (1) through the source of said relatively invariable direct voltage to the moveable tapping of a potentiometer reserved for measuring that voltage, and (2) through the source of another voltage to be measured or nulled to the tapping of another potentiometer.

A diagram of a thermionic valve circuit embodying the invention is shown in the accompanying drawing. This circuit may be employed either for measuring a direct voltage, or for observing when a direct voltage or an alternating voltage is brought to null value. It is immaterial whether either side of the applied alternating or direct voltage is earthed.

A pair of similar valves 1, 2 have their anode circuits connected across an unearthed alternating voltage supply derived through a transformer 12 from source 16, which may, for example, be a 50 volt 50 cycle source. These anode circuits comprise separate and similar anode load resistors 3, 4, and a common cathode load consisting of a plurality of resistance potentiometers 5, 6, 7, 8, all in parallel, provided with a by-pass smoothing condenser 13. The control grid of valve 2 is connected to the moveable tapping on potentiometer 5. The control grid of valve 1 is arranged to be connected through switch 9 alternatively, either directly to the centre tap on potentiometer 6, or through a pair of input terminals 15 to the centre tap on potentiometer 6, or through a pair of input terminals 10 to the moveable tapping on the potentiometer 8, or through a pair of input terminals 14 to the moveable tapping on potentiometer 7. A centre-zero direct current indicator 11 is connected directly between the anodes of the valves 1, 2. No point of the valve circuit is earthed.

In order to adjust the circuit for any inequalities, the switch 9 is first placed in the attitude to connect the control grid of valve 1 directly to the centre tap on potentiometer 6, and the moveable tapping on potentiometer 5 is then moved until a null indication is obtained on indicator 11.

Switch 9 may then be thrown to the attitude in which the control grid of valve 1 is connected through terminals 10 to the moveable tapping on potentiometer 8. A direct voltage to be measured is applied between terminals 10. If the value of this direct voltage input is zero, a null indication will be obtained when the tapping on potentiometer 8 is moved to its middle position. Any departure from the middle position which may be necessary in order to obtain a null indication is a measure of the direct voltage input at terminals 10. This voltage is equal to the voltage drop in potentiometer 8 between the mid position and the position giving a null reading.

If it is desired to read the value of the direct voltage input at terminals 10, the moveable tapping on potentiometer 8 may be provided with a graduated scale. If, however, it is merely required that another instrument shall be set in accordance with that voltage input, then a mechanical coupling may be employed between the tapping on potentiometer 8 and the said other instrument.

If switch 9 is now thrown to the attitude in which the control grid of valve 1 is connected through terminals 14 to the moveable tapping on potentiometer 7, then this moveable tapping can be adjusted to obtain a null indication without disturbing the setting of the moveable tapping of potentiometer 8. Just as the setting of potentiometer 8 for a null indication was a measure of the direct voltage input between terminals 10, so the setting of the moveable tapping of 7 which yields a null indication is a measure of a direct voltage input applied between terminals 14.

Any desired number of further potentiometers similar to 7, 8 may be provided, each having a further pair of input terminals connected between its moveable tapping and a further position of switch 9, for the measurement of further direct input voltages.

The provision of a separate potentiometer for measuring each of a plurality of relatively invariable direct voltages gives the advantage that the settings of the moveable tappings need not be disturbed when changing over from one to another. Thus the settings of the moveable tappings continue to represent the last readings of each, and will usually be approximately correct when returns are made to each for correction of their settings.

If switch 9 is thrown to the attitude in which the control grid of valve 1 is connected through terminals 15 to the centre tap on potentiometer 6, the null reading of indicator 11 will be disturbed if any voltage, direct or alternating, is applied between terminals 15. If, for example, it is desired to measure an alternating voltage in phase with that of source 16, this may be applied, in series with the output of a linear potentiometer 17 connected across the source 16, to the primary winding of a transformer 18. The secondary winding of the transformer 18 will be connected between terminals 15. The potentiometer 17 will then be adjusted until a null reading is obtained on indicator 11. Then the applied alternating voltage must be equal in amplitude to the output voltage of the linear potentiometer 17, and its value is indicated by the setting of the potentiometer.

It is an important feature of the invention that a reversal of phase of an alternating voltage applied between terminals 15 produces a reversal of the current through indicator 11, so a sense indication is obtained when nulling an alternating voltage.

This application is a division of application Serial No. 512,402, filed November 30, 1943.

We claim:

1. A null voltage indicating circuit, comprising a pair of similar thermionic valves each containing at least an anode, a cathode and a grid and having similar anode loads, a direct current null indicating meter connected between the anodes of said valves, an alternating voltage source for exciting the anode circuit of said valves, a common cathode load for said valves connected in series with the cathodes and said alternating voltage source and comprising two resistance potentiometers connected in parallel with each other and a smoothing condenser in parallel with said potentiometers, means to connect the grid of one of said valves directly to a tapping on one of said potentiometers and means to inject the voltage to be nulled in series with the grid of the other of said valves and a tapping on the second of said potentiometers, said tapping on the second of said potentiometers being so selected that when said voltage is zero a null indication is obtained on said meter, said circuit being so constructed and arranged that when an alternating voltage is injected for nulling, a reversal of phase of said voltage produces a reversal of the current flow through said meter so as to give a sense indication.

2. A circuit according to claim 1, arranged for measuring a direct voltage injected in the place of said voltage to be nulled, wherein the tapping on said second potentiometer to which said voltage is connected is made moveable so as to add in series with said injected direct voltage, an opposing direct voltage being a fraction of the total voltage developed across said potentiometers, and wherein the degree of said movement necessary to produce a null indication is a measure of the direct voltage injected.

3. A circuit according to claim 2, for alternatively measuring a direct voltage which is relatively invariable, and measuring or nulling at least one other voltage, said circuit having a third resistance potentiometer connected in parallel into said cathode load, and having switching means for connecting the grid of one of said valves alternately through the source of said relatively invariable direct voltage to the moveable tapping of the second potentiometer and through the source of said other voltage to be measured or nulled to the tapping of said third potentiometer.

4. A null voltage indicating circuit comprising a pair of similar thermionic valves each containing at least an anode, a cathode and a grid, a direct current null indicating meter connected between the anodes of said valves, a circuit including an alternating voltage source, similar fixed resistances connecting the anodes of said valves to said source and a common cathode load comprising a plurality of resistance potentiometers in parallel with each other and a smoothing condenser in parallel with said potentiometers, said load being connected in series with the cathodes of said valves and said alternating voltage source, means for connecting the grid of one of said valves directly to a tapping on one of said potentiometers, and switch means for injecting a voltage to be nulled in series with the grid of the other of said valves and a tapping on at least one other of said potentiometers, said last named tapping being so selected that when said voltage is zero a null indication is obtained on said meter.

LESLIE HERBERT BEDFORD.
JOHN BELL.
ERIC MILES LANGHAM.

REFERENCES CITED

The following references are of record in the file of this patent:

UNITED STATES PATENTS

| Number | Name | Date |
|---|---|---|
| 1,919,538 | Stone | July 25, 1933 |
| 2,143,219 | Wenger | Jan. 10, 1939 |
| 2,200,055 | Burnett | May 7, 1940 |
| 2,207,976 | Ferrell | July 16, 1940 |
| 2,226,255 | Percival | Dec. 24, 1940 |
| 2,264,197 | Hadfield | Nov. 25, 1941 |
| 2,305,307 | Wellenstein | Dec. 15, 1942 |
| 2,329,073 | Mitchell et al. | Sept. 7, 1943 |

FOREIGN PATENTS

| Number | Country | Date |
|---|---|---|
| 526,869 | Great Britain | Sept. 26, 1940 |